United States Patent [19]
Lim et al.

[11] Patent Number: 5,996,031
[45] Date of Patent: Nov. 30, 1999

[54] SYSTEM AND METHOD FOR THE REAL TIME SWITCHING OF AN ISOCHRONOUS DATA STREAM

[75] Inventors: Guan C. Lim, Walnut; Joahin Hou, Cerritos, both of Calif.

[73] Assignee: Ericsson Inc., Research Triangle Park, N.C.

[21] Appl. No.: 08/829,410

[22] Filed: Mar. 31, 1997

[51] Int. Cl.$^6$ ................................................. G06F 13/00
[52] U.S. Cl. .................. 710/52; 710/20; 710/21; 710/29
[58] Field of Search ................................ 395/872, 832, 395/840, 841, 842, 845, 849, 850, 853, 856, 859, 865, 866, 868; 710/52, 12, 20, 21, 22, 25, 29, 30, 33, 36, 39, 45, 46, 48

[56] References Cited

U.S. PATENT DOCUMENTS

| | | | |
|---|---|---|---|
| 5,521,928 | 5/1996 | Worsley et al. | 370/67 |
| 5,544,324 | 8/1996 | Edem et al. | 395/200.17 |
| 5,594,734 | 1/1997 | Worsley et al. | 370/67 |
| 5,633,865 | 5/1997 | Short | 370/412 |
| 5,778,218 | 7/1998 | Gulick | 395/558 |

*Primary Examiner*—Ayaz R. Sheikh
*Assistant Examiner*—Tim T. Vo
*Attorney, Agent, or Firm*—Jenkens & Gilchrist, P.C.

[57] ABSTRACT

An improved system and method for the transference of data with minimal delay and loss is disclosed. Primarily useful in maintaining the flow of an isochronous data stream, the present invention minimizes delay through the use of a shared buffer for both the data source and destination and without reliance upon an interrupt to transfer data. The present invention minimizes data loss through the use of a double buffer, the size of which is adjusted to accommodate interrupt latency without increasing transference delay.

25 Claims, 12 Drawing Sheets

SYSTEM AND METHOD FOR THE REAL TIME SWITCHING OF AN ISOCHRONOUS DATA STREAM

BACKGROUND OF THE PRESENT INVENTION

1. Field of the Invention

The present invention is directed to a system and method for improved communication between two devices, particularly, to a system and method for the real time switching of an isochronous data stream between two devices.

2. Background and Objects of the Present Invention

A key element in computer system performance is the minimization of processor interrupts during program execution. Early computers interrupted the processor for every character transferred in an input/output (I/O) operation, e.g., moving a character of data between the processor and a storage device. Later techniques collected a block of such characters before interrupting the processor and transferred the entire block in one I/O operation, minimizing interruptions. A further improvement over early computer systems was the use of a Direct Memory Access (DMA) channel, improving computer operations by preserving the processor's operation state instead of interrupting the executing program, swapping it with the transference program and swapping the executing program back after the I/O operation is complete. With DMA, processor operation was only delayed.

With the increasing proliferation of computers into every aspect of society, new techniques of data transference are necessary to accommodate the flood of information. One problematic aspect of this informational deluge on existing computer systems is the requirement of isochronicity, i.e., real-time or interactive communication. Isochronous communications and data transference are present in a variety of industries, e.g., telephony, and involve a multitude of products, e.g., telephones, microphones, modems, keyboards, mice, joysticks, scanners, printers, CD-ROM devices, tape and floppy drives, and a host of other peripherals. By reason of the interactive nature of isochronous data, e.g., a telephone conversation, the queuing or buffering of such data may interfere with the dynamics of the conversation (or movie, video game, etc.) by introducing a deleterious delay or latency in the isochronous data stream transmission, destroying the illusion of true interactivity. Further, if the delay in isochronous data delivery is long enough, e.g., a speech segment or frame of a movie, the data may be discarded or lost in an effort to maintain a real-time communication link.

It is, accordingly, an object of the present invention to prevent or ameliorate the aforementioned deleterious delays in the transmission of an isochronous data stream.

It is a further object of the present invention to prevent or reduce the loss of data during the aforesaid isochronous data stream transmission.

SUMMARY OF THE INVENTION

The present invention is directed to an improved system and method for the transference of data with minimal delay and loss. Primarily useful in maintaining the flow of an isochronous data stream, the present invention minimizes delay through the use of a shared buffer for both the data source and destination, and further minimizes data loss through the use of a double buffer.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PRESENTLY PREFERRED EXEMPLARY EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
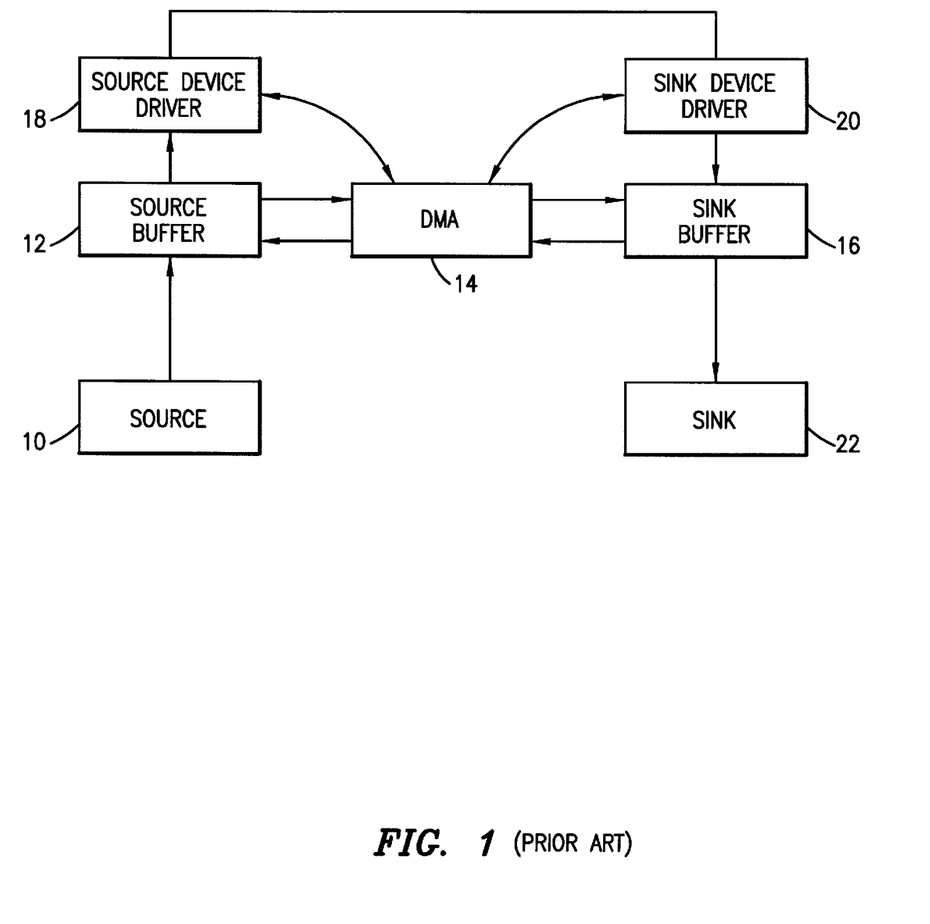
FIG. 1 is a schematic diagram illustrating a conventional data transference configuration using a DMA.

With reference now to FIG. 1, there is illustrated a schematic diagram of the various components of a computer system incorporating the aforedescribed and conventional DMA technology. A source device 10, e.g., a mono microphone, forwards or outputs a multiplicity of data segments or samples to a source buffer 12, where the data accumulates until a particular number of such samples is reached. For example, source device 10 may produce 160 bytes (or 10 samples) of data for a given period, e.g., a service period of 20 ms, and buffer 12 may hold enough data for two such service periods, e.g., 320 bytes of data (20 samples). When one half of buffer 12 is full, a DMA device 14 then interrupts the application currently running on the computer system (not shown) while continuing to fill the other half of buffer 12. The DMA 14 then forwards the buffered data en masse to another (sink) buffer 16, via a source driver 18 and a sink driver 20. The transferred data accumulates within sink buffer 16, preferably until at least one service period of data, i.e., 20 ms worth, is ready to forward to a sink device 22, e.g., a mono speaker, attached thereto. As shown in FIG. 1, DMA 14 controls the operations of the source and sink buffers 12 and 16, respectively, and the source and sink drivers 18 and 20, respectively, to coordinate the block data flow in the aforedescribed manner.

As is understood by those skilled in the art, the service periods of the source and sink drivers 18 and 20, respectively, are chosen to account for any interrupt latency variabilities that may be present in the operating system environment. In other words, different operating system environments require different service periods for reliable operation. The service periods are also selected to place a minimum interrupt load on the system since there may be other software applications in the computer system that require processing time.

Figure 2:
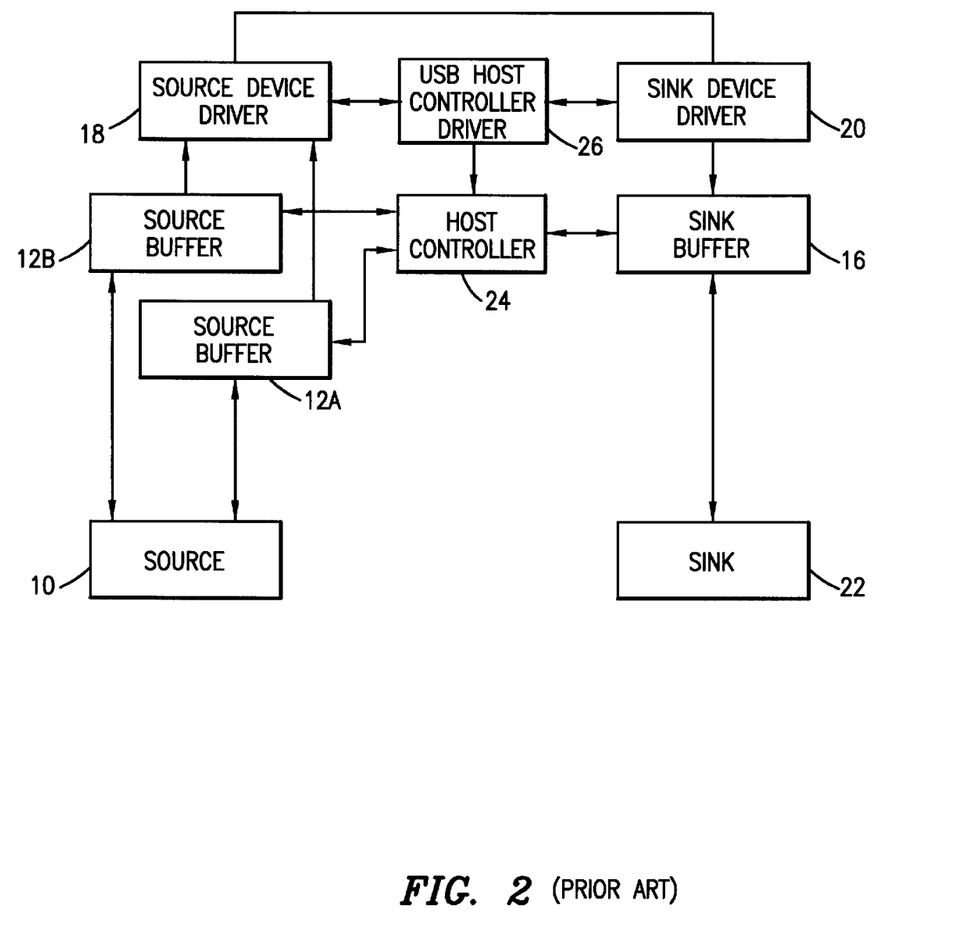
FIG. 2 is a schematic diagram illustrating another conventional data transference configuration using a Universal Serial Bus (USB)

With reference now to FIG. 2, there is illustrated a schematic diagram of various components of another conventional computer system, which, as with the DMA architecture shown in FIG. 1, governs the buffering and transference of data between two devices, i.e., the aforedescribed source and sink devices 10 and 22, respectively. Instead of DMA, however, the configuration shown in FIG. 2 operates pursuant to a current peripherals bus standard called Universal Serial Bus (USB), a recent standard developed by PC and telecommunications industry leaders to facilitate the plug and play of computer peripherals, e.g., telephones, modems, mice, etc. Another difference is the use of two source buffers, i.e., source buffers 12A and 12B, respectively. A host controller 24 controls the operation of source buffers 12A and 12B and sink buffer 16. A USB host control driver 26 controls the operation of the respective source and sink drivers 18 and 20 for the aforementioned buffers, and communicates with host controller 24.

In operation, the host controller 24 queues data in one of the source buffers, e.g., buffer 12A. When buffer 12A is full, the processor (not shown) is then interrupted and the USB host control driver 26 coordinates forwarding the buffered data to the sink buffer 16, via the respective source and sink drivers 18 and 20. Meanwhile, host controller 24 requests the input data stream from source device 10 to fill the other buffer, i.e., source buffer 12B. Upon filling source buffer 12B, host controller 24 switches back to buffer 12A in the aforedescribed manner.

As discussed, existing systems, such as those illustrated and described in connection with FIGS. 1 and 2, are unable to adequately handle isochronous data transfers. One major drawback of the existing systems is that the transfer delay (i.e., the time elapse from the time the data is produced at the source device 10 to the time at which the same data is transferred to the destination device 22) is tightly coupled with the frequency of the interrupt that services the transfer. In the DMA technique of FIG. 1, for example, interrupts occur every 20 ms and the data transfer delay is greater than 20 ms (i.e., 20 ms plus handling time). In particular, at present no general purpose operating system (OS) is able to handle the aforedescribed interrupts at the real-time sampling rate of the various input devices, and the data transfer delay introduced by software in the existing system cannot be reduced without overloading the OS.

Another drawback is the loss of data due to interrupt latency. If the OS lags behind in servicing the interrupt, the data produced by the source device 10 will be lost because of buffer space filling. In the DMA technique of FIG. 1, for example, if the first interrupt is not serviced by the OS within 20 ms, the second half of the buffer will be filled by the source device 10 and further data will be lost. The USB technique, the configuration of which is illustrated and described in connection with FIG. 2, did not solve these serious problems.

With reference now to FIGS. 3–8, there is illustrated a presently preferred embodiment of the present invention which, for example purposes, also utilizes the USB data transference standard. According to the USB standards, isochronous data is delivered at 1 ms intervals. Also, for purposes of illustration, it may be understood that the input (source) and output (sink) devices have the same sampling rate and size. It should nonetheless be understood that rate matchers and mixing devices could be employed to accommodate disparate sampling rates and sizes. Another assumption is that both the input and the output devices are synchronous devices and are, for the most part, in synchronicity. For further illustration purposes, it should be understood that the input and output devices have a sampling rate of 8,000 samples per second with a sample size of 1 byte.

As will be described in more detail herein, the aforementioned problems of delay and data loss present in the conventional systems described in connection with FIGS. 1 and 2 are prevented by the introduction of a common or shared buffer for the source device 10 and sink device 22 to eliminate delay, and double buffering to eliminate the problem of data loss.

Figure 3:
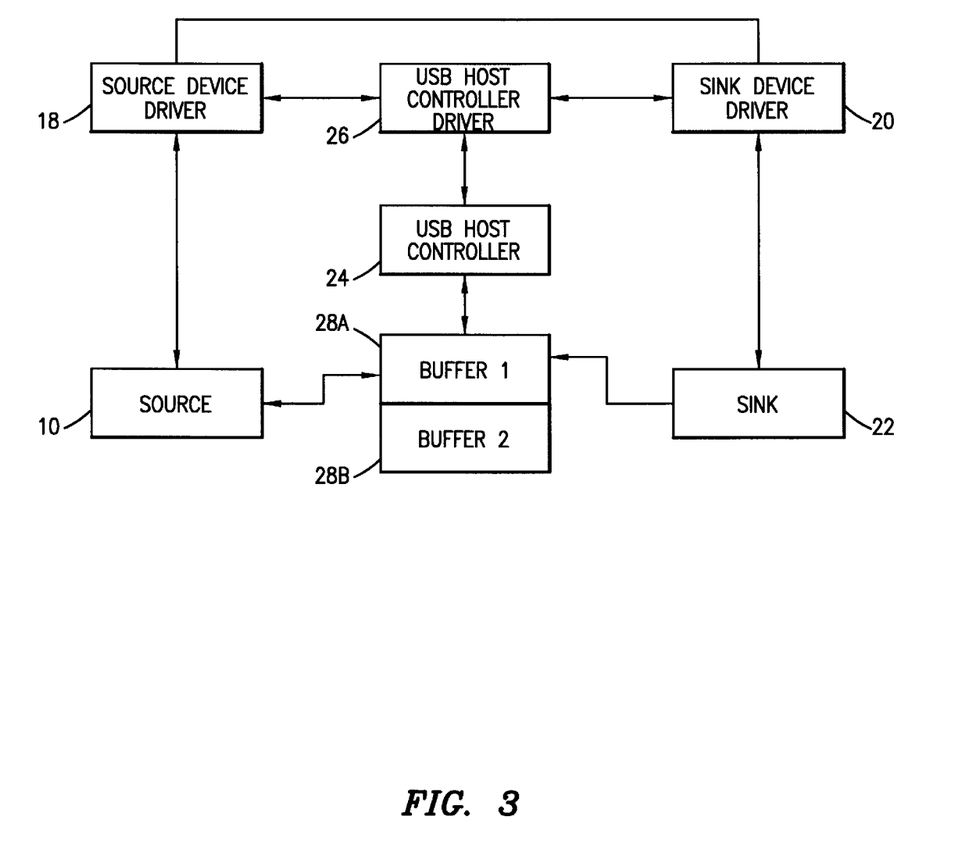
FIG. 3 is a schematic diagram illustrating a first embodiment of the present invention.

With particular reference now to FIG. 3 of the drawings, there is illustrated a schematic diagram of the various components of a computer system incorporating a presently preferred embodiment of the present invention utilizing the USB data transference standard.

As described more fully in connection with FIGS. 1 and 2, the source device 10 forwards data samples to the sink device 22 through commands from the host controller 24 and the respective drivers 18 and 20. Instead of separate source 12 and sink 16 buffers, however, the present invention utilizes a pair of common or shared buffers 28A and 28B. As will be described more fully hereinafter, both the source 10 and sink 22 devices start at the same buffer location, i.e., source device 10 transfers data to the common buffers and sink device 22 transfers data from the common buffers, but the sink device 22 starts its data transfer one transfer interval, e.g., about 1 ms, later than that of the source device 10. It should be understood that the host controller 24 preferably does not perform internal buffering or pre-fetching. If, however, host controller 24 were prefetching, the delay time would need to be adjusted accordingly. It should further be understood that with two common buffers in use, i.e., 28A and 28B, the USB host controller 24 can better facilitate data transference without loss. In particular, while controller 24 interrupts the CPU (not shown) of the computer system when data transference at one buffer, e.g., common buffer 28A, is completed, data transference continues on the remaining buffer, i.e., common buffer 28B, without loss of data. Similarly, when common buffer 28B is filled and the CPU interrupts, data transference continues unabated on common buffer 28A, as described.

Figure 4:
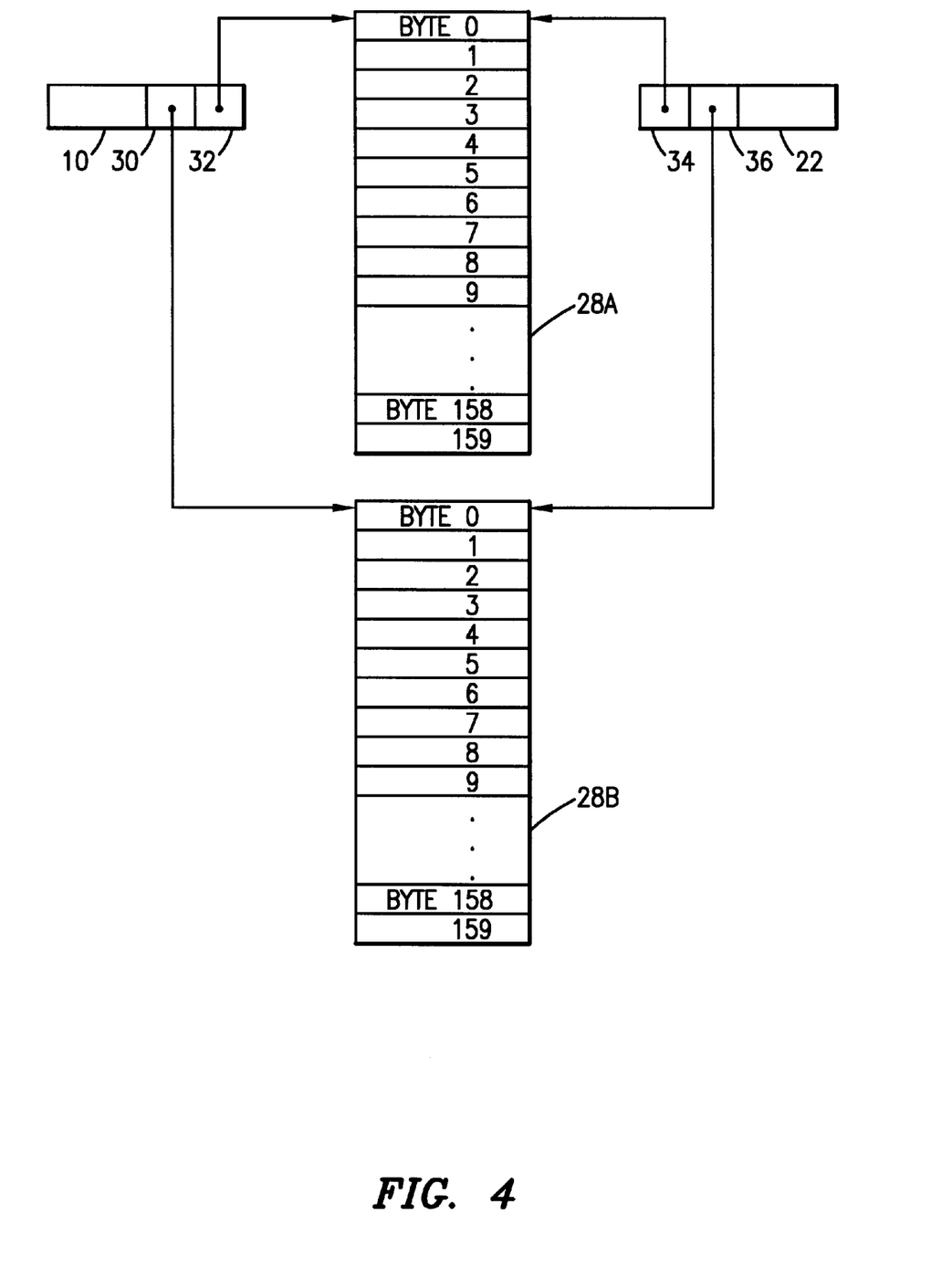
FIGS. 4–8 are schematic diagrams further illustrating the embodiment of FIG. 3 and showing initial and subsequent states of source and destination devices and their pointers.

With particular reference now to FIG. 4, the method for real-time switching of isochronous data between two devices will now be described. The first step for a system, such as shown in FIG. 3, implementing the present invention is to allocate the pair of common buffers 28A and 28B within computer memory. For purposes of illustration the buffers 28A and 28B are preferably each 160 bytes in size, i.e., large enough to hold 160 of the aforementioned samples of data (20 ms worth) to be transferred from source device 10 to sink device 22. Each common buffer 28A and 28B is preferably initialized with nurture data which it should be understood is application dependent, e.g., for voice data, silence. As shown in FIG. 4, both the source and sink devices 10 and 22, respectively, have a pair of indicators or pointer fields therein, i.e., source device 10 has a pair of pointers 30 and 32 and sink device 22 has a pair of pointers 34 and 36 therein. Since the common buffers 28A and 28B are initially empty, "active" pointers 32 and 34 point to the beginning of buffer 28A, i.e., byte 0 where the data transference initially occurs. The "queuing" pointers 30 and 36 point to the beginning of the next available buffer, i.e., common buffer 28B. As discussed, the data transfer from the buffers to the destination (sink) device is scheduled to start about 1 ms after the transfer from the source to the buffers has begun.

Figure 5:
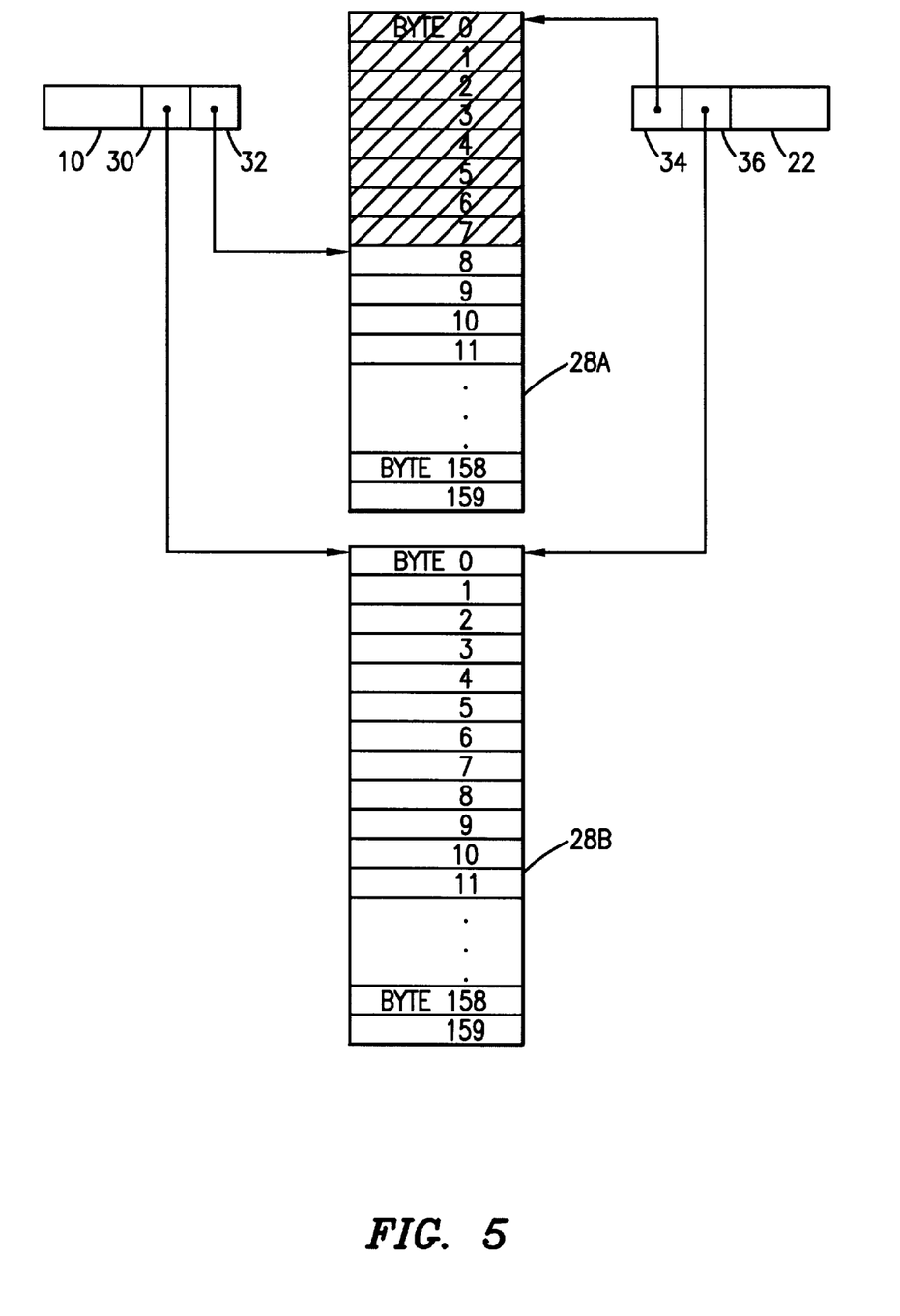
Figure 6:
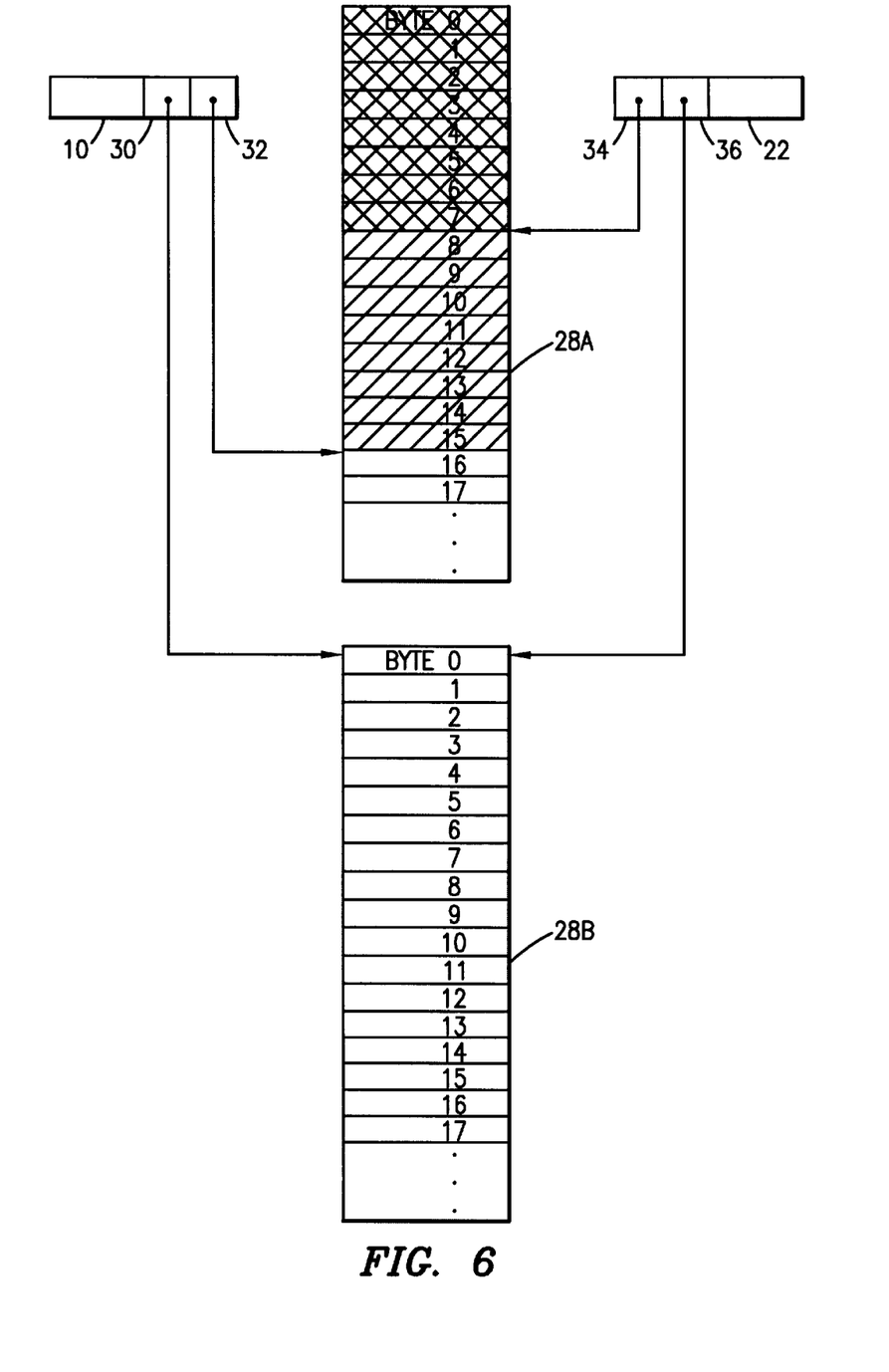

With reference now to FIG. 5, eight bytes (eight samples) have been transferred from source device 10 to common buffer 28A and are indicated by the shaded bytes 0–7. As shown in the FIGURE, the active pointer 32 for source device 10 points to the next available memory in shared buffer 28A, i.e., byte 8. The active pointer 34 for sink device 22 has not yet moved since the 1 ms delay has not yet transpired. With reference now to FIG. 6, the configuration of the devices illustrated in FIG. 5 is shown 1 ms later where another eight samples or bytes have been transferred from source device 10 to common buffer 28A, i.e., bytes 8–15 (shaded), and eight samples or bytes have been transferred from buffer 28A to sink device 22, i.e., the aforementioned first eight bytes 0–7, now marked by cross-hatching to indicate complete data transference. Pointer 32 now points to byte 16, i.e., the next available memory for data transference, and pointer 34 points to byte 8, i.e., the next byte of buffer data to be transferred.

It should be understood from FIGS. 5 and 6 et al. that the active pointer 34 for sink device 22 trails pointer 32 for source device 10 by eight data samples, i.e., 8 bytes. In other words, data transference from the common buffer 28A to the sink device 22 is only eight samples behind the data transfer to buffer 28A, which translates to a 1 ms time lag, i.e., an amount of time short enough to appear simultaneous to a user.

Figure 7:
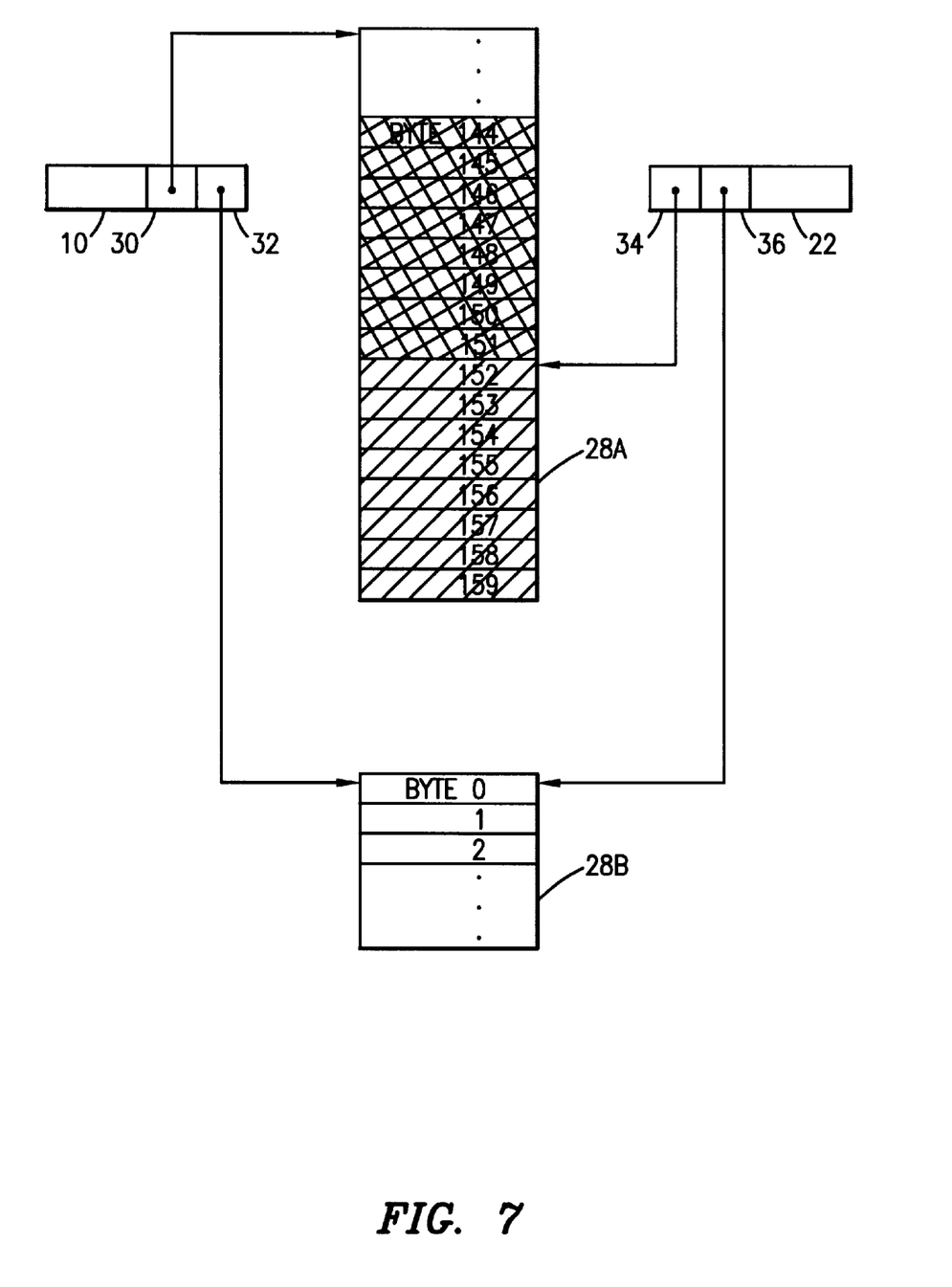

It should also be understood that in the example set forth herein that 20 ms after the initial data transference to buffer 28A, source device 10 has filled common buffer 28A with data, as shown in FIG. 7. A system interrupt indicating the filling of buffer 28A, can be ignored in the present embodiment. As shown in FIG. 7, active pointer 32 now points to byte 0 of the other common buffer 28B, i.e., the next available memory location. Queuing pointer 30 now points to byte 0 of buffer 28A, i.e., the next available buffer since buffer 28B is now in use by the source device 10. Active pointer 34 points to byte 152 of buffer 28A, i.e., eight samples behind, and queuing pointer 36 still points to the next buffer for use by sink device 22, i.e., buffer 28B.

Figure 8:
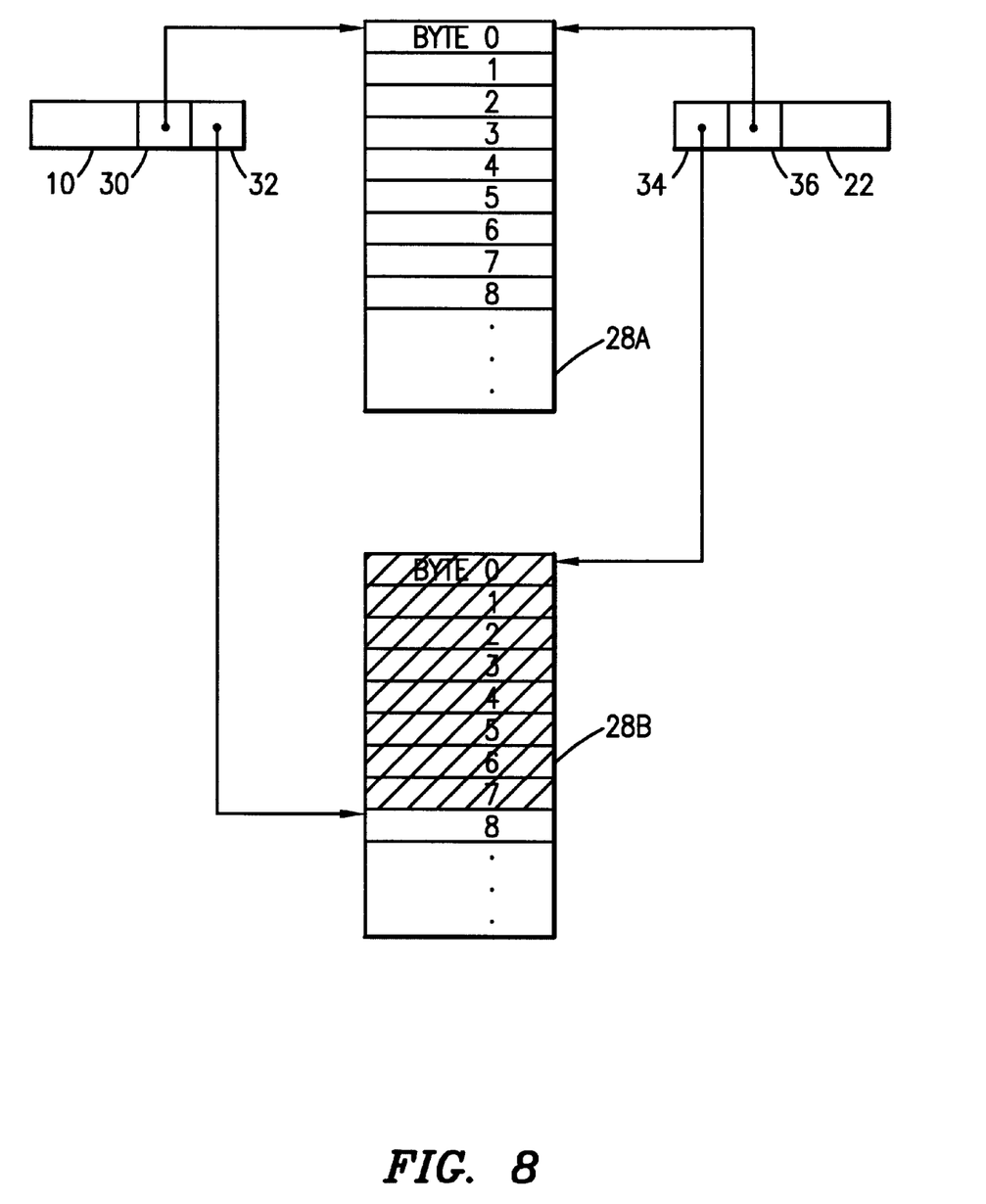

With reference now to FIG. 8, eight more samples or bytes of data have been transferred into common buffer 28B by the source device 10. Active pointer 32, accordingly, points to byte 8 of common buffer 28B. Active pointer 34, now that the data transference from common buffer 28A is complete, follows active pointer 32 and points to byte 0 of common buffer 28B. After all the data within common buffer 28A has been transferred to the sink device 22, a system interrupt occurs and the contents of buffer 28A are reinitialized with nurture data, as described. Queuing pointer 36, as with queuing pointer 30 of source device 10, now points to byte 0 of buffer 28A, i.e., the next available buffer. In the aforedescribed manner, data transference repeats, switching between the two available buffers 28A and 28B.

It should be understood by those skilled in the art that the aforedescribed embodiment of the present invention improves the handling of the data transference by introducing only 1 ms of delay, i.e., the transfer interval of the USB. Furthermore, the interrupt frequency is no longer tied to the transfer delay, allowing adjustments to suit the Operating System (OS) environment without affecting transfer delay. The interrupt frequency is now a function of the buffer size. To reduce the interrupt frequency, buffer size must be increased, i.e., an inverse relationship. Since the interrupt rate can be reduced without increasing delay, the danger of losing data due to interrupt latency may now be greatly reduced or eliminated.

Figure 9:
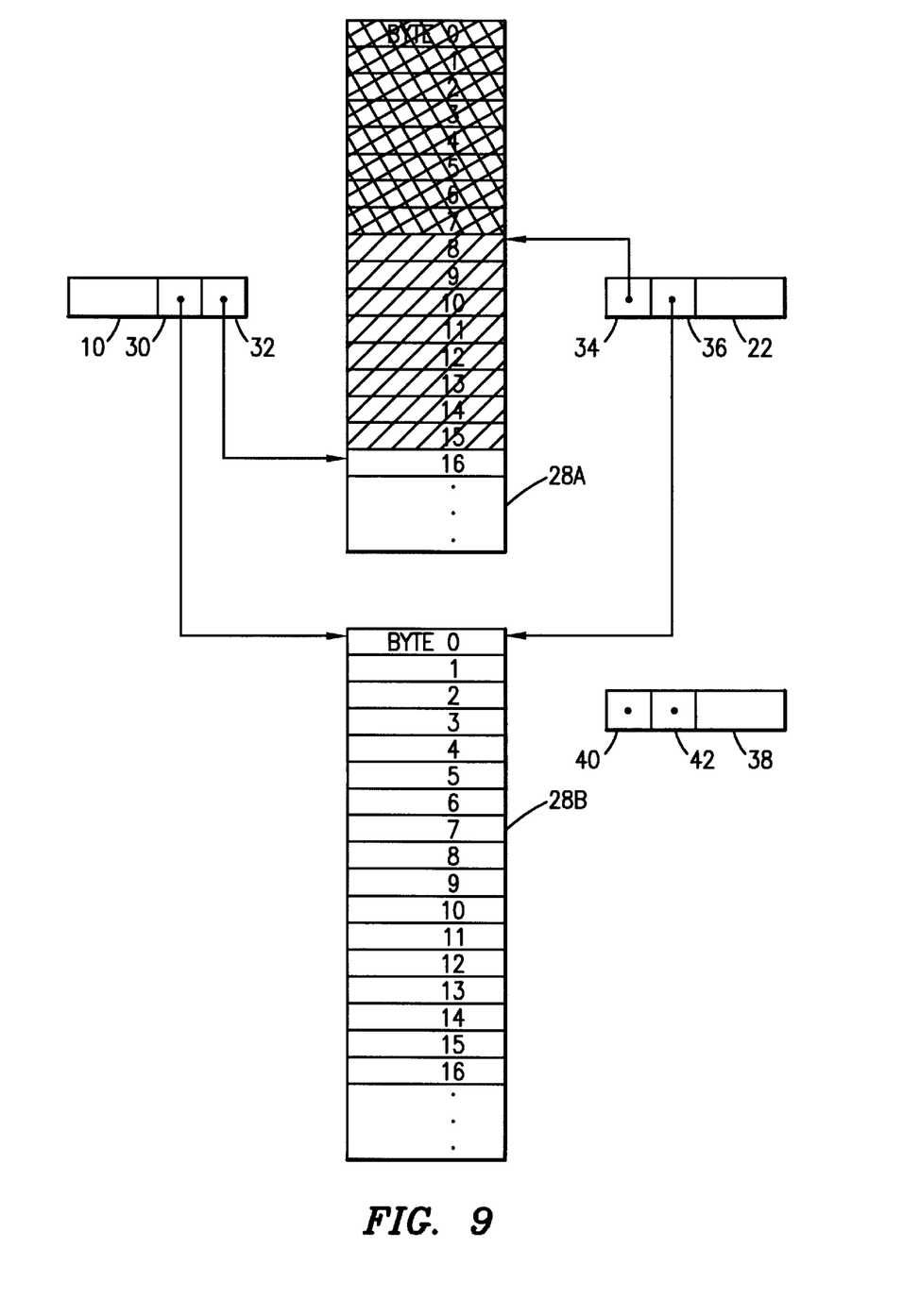
FIG. 9 is a schematic diagram illustrating a second embodiment of the present invention and showing the source, destination and new destination devices and their pointers in a first state.
Figure 10:
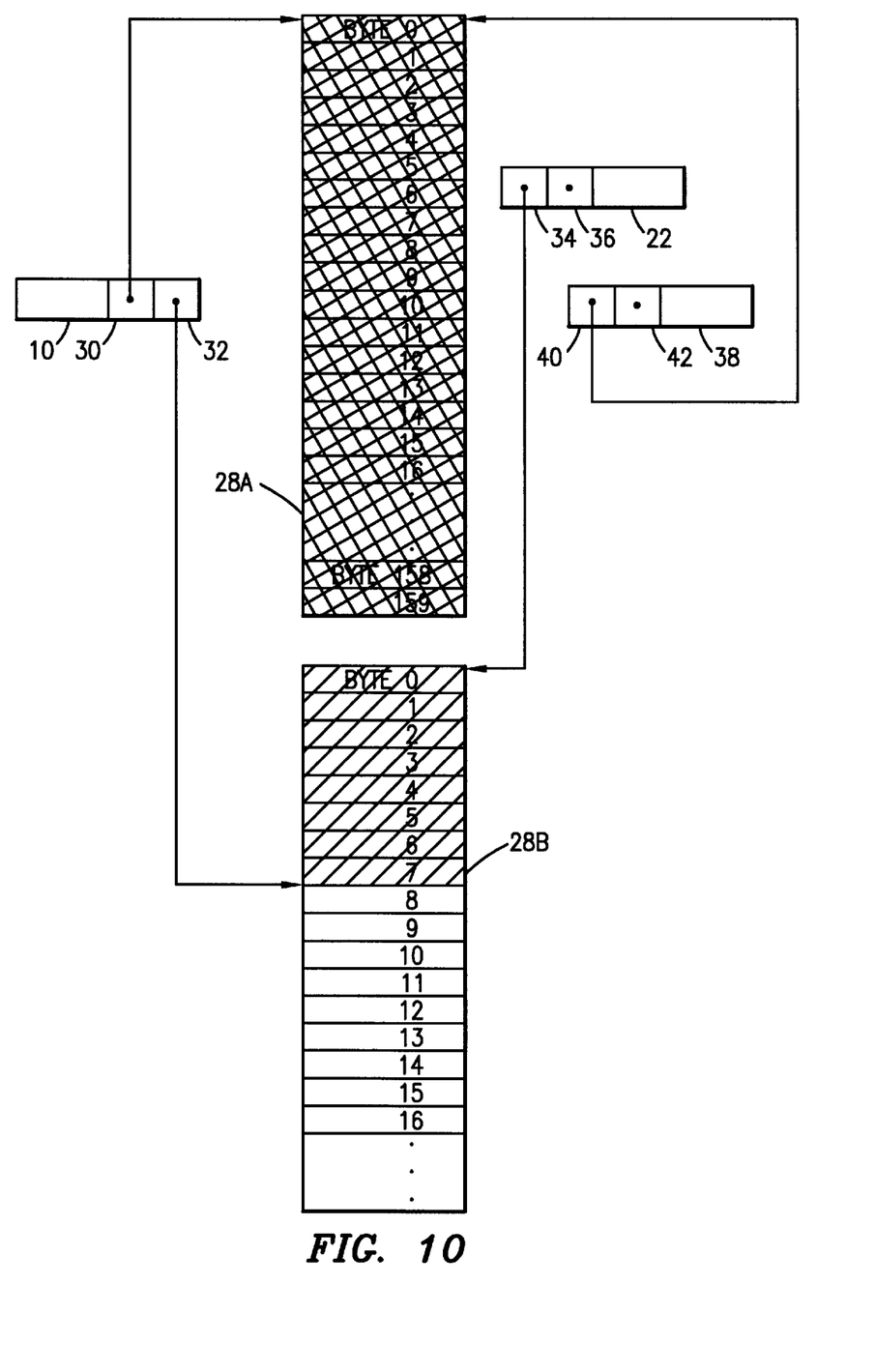
FIGS. 10 and 11 are schematic diagrams further illustrating the embodiment of FIG. 9 and showing subsequent states of the devices and pointers.
Figure 11:
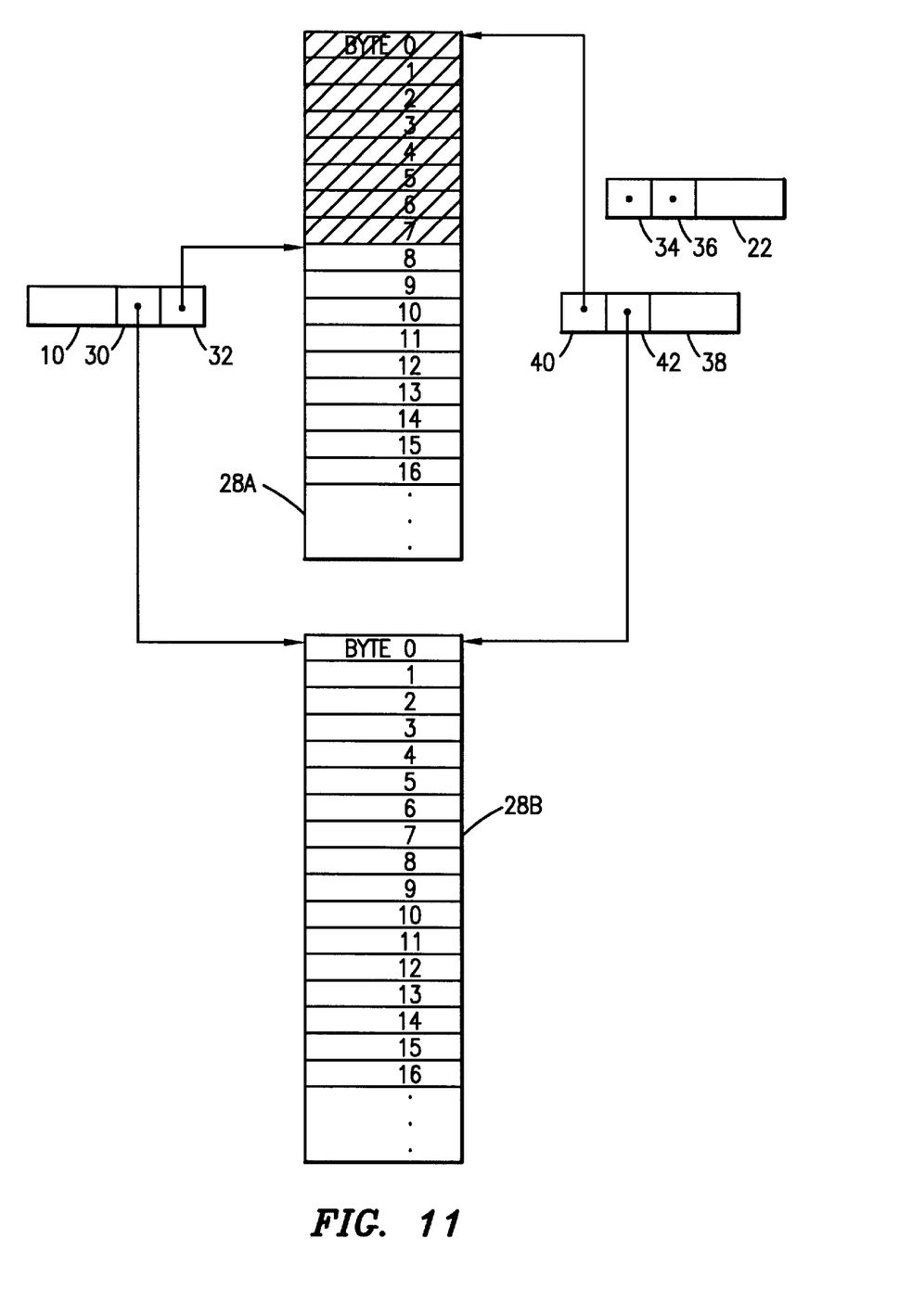

With reference now to FIG. 9, there is shown an alternate embodiment of the present invention, one that is useful in a general purpose computer where it is frequently necessary to redirect an isochronous data stream from one output device to another. As shown in FIGS. 9–11, a data transference between two devices, e.g., source device 10 and sink device 22 as described in connection with the first embodiment, has already been established and is in progress. Another sink device 38 is also illustrated, one to which the data stream from source device 10 is to be directed upon setting of a redirection flag or other system command (not shown). No redirection, however, is possible until the occurrence of a system interrupt from sink device 22, e.g., when pointer 34 reaches the end of the buffer, i.e., common buffer 28B, as shown in FIG. 9. Pointers 40 and 42 of the new sink device 38 are initially empty.

With reference now to FIG. 10, the system configuration of FIG. 9 is shown immediately after a system interrupt from sink device 22, e.g., after active pointer 34 reached byte 159 of buffer 28A. After said interruption, buffer 28A is then filled with the appropriate nurture data for the new sink device 38, as described. Queuing pointer 30 is then set to the beginning (byte 0) of common buffer 28A and active pointer 32 continues to guide the transference of data from source device 10 to common buffer 28B with the active pointer 34 of sink device 22 trailing in the aforedescribed manner. Active pointer 40 of the new sink device 38 is also set to byte 0 of common buffer 28A in anticipation of the switch from sink device 22 to new sink device 38. The queuing pointers 36 and 42 of the old 22 and new 38 sink devices, however, are currently empty. Data transference from source device 10 to common buffer 28B to sink device 22 continues until the switchover to the new sink device 38 occurs, e.g., after sink device 22 interrupts. It should be understood that after said interruption common buffer 28B is then filled with nurture data, as described.

After switching to new sink device 38, data transference from source device 10 to common buffer 28A to sink device 38 begins with active pointer 40 stepping through the samples or bytes within common buffer 28A but eight samples behind active pointer 32, as described hereinbefore and as illustrated in FIG. 11. Queuing pointers 30 and 42 now point to byte 0 of common buffer 28B and both pointers 34 and 36 of the first sink device 22 are empty. Data transference then proceeds as described in connection with the previous embodiment but with the new device.

In the aforedescribed manner, no data is lost during the data transference switch since the data from source device 10 was either transferred to sink device 22 before the switch-over or transferred to sink device 38 after the switchover. Although some delay is inherent in the switchover between two disparate devices, in the present embodiment the switchover latency, i.e., time between the initial command for the switch to the commencement of data transference to sink device 38, is bounded by 2 T, where T is the time required to fill a given buffer. In the instant embodiment, 2 T equals 40 ms.

It should, of course, be understood that the above data transference switchover may be syncopated by aborting the data stream from source device 10 to sink device 22 and immediately establishing a new data stream from source device 10 to sink device 38 by adjusting the aforedescribed pointers and not waiting for the interrupts. Although this alternative has a shorter switchover latency that is limited only by system processor speed, the data produced by the source device 10 during this switchover time is lost.

Figure 12:
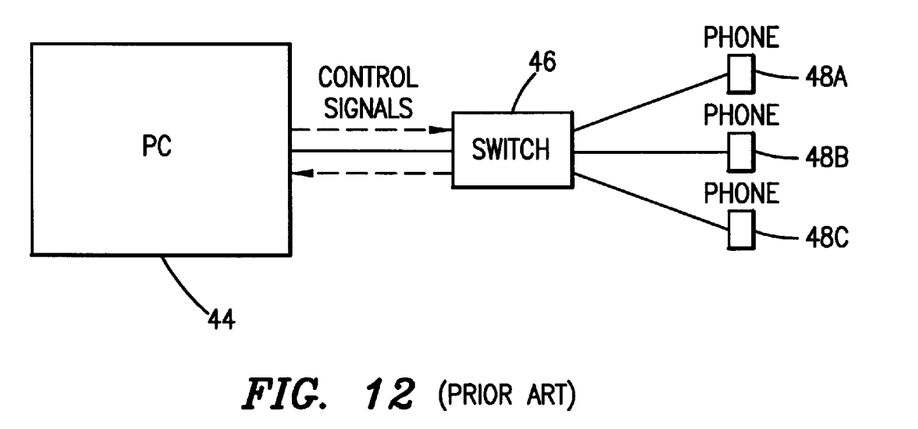
FIG. 12 is a block diagram illustrating a conventional hardware switch configuration between a PC and telephone.
Figure 13:
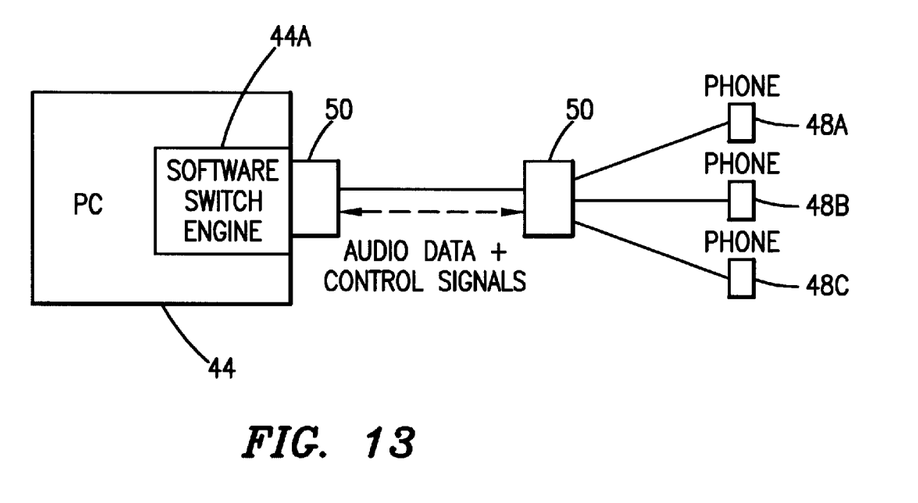
FIG. 13 is a block diagram illustrating a third embodiment of the present invention and showing a software switch.

Illustrated in FIGS. 12 and 13 are a conventional telephonic device and a further embodiment of the present invention, respectively, both directed to implementations linking PCs with telephones. Presently, computer telephony is concentrated on computer control of switching hardware. For example, in conventional telephonic devices the switching of an audio data stream is done exclusively in hardware, as illustrated in FIG. 12. A PC 44 is connected to an external or internal switch 46, to which are connected a multiplicity of telephones 48A–C, as is understood in the art. In accordance with the present invention, the above telephone switching mechanism may instead be provided in software without the switching hardware or in conjunction with the switching hardware.

As shown in FIG. 13, through use of a USB interface 50, a software switch 44A may be employed to transfer audio signals (and control signals) to and from the PC 44. In order to maintain isochronous communications linkage, the aforedescribed principles of the present invention may be employed to preserve the integrity of the multiplicity of telephonic connections illustrated. As is understood by those skilled in the art, the total number of simultaneous connections the system can support is bounded by the bandwidth of the USB standard, currently 12 Mbs. As is also understood in the art, every such audio connection takes 128 kbs of bandwidth for PCM 8 bit 8 kHz mono audio data. Further, the memory required for each such connection is 320 bytes for 20 ms interrupt interval, where the interrupt interval increases proportionate to the increase in buffer size. It should, accordingly, be understood that the interrupt frequency is in an inverse relationship with the buffer size.

It should additionally be understood that although common buffers 28A and 28B are preferably equal in size, e.g., 160 bytes each, other configurations are possible and the buffers may differ in size for particular operations. Further, as described, the buffer size may be variable in size for different operations and data types, e.g., sound and video data differ markedly in quantitative size and frequency. Consequently, the buffer size may be adjusted accordingly to accommodate video frame sizes.

It should also be understood that although the principles of the present invention are readily applicable to telephonic uses, numerous other usages of the subject matter of the present invention are contemplated.

It should further be understood that by using the aforedescribed double buffering technique, not only is data not lost in transference, but the time delay from source to destination is greatly minimized to, for example, about 1 ms to 5 ms, preferably, about 1 ms. In the embodiments of the present invention shown in the figures, the destination active pointers, e.g., active pointer 34 and 40 for the destination pointers in FIGS. 4–11, trail the source active pointer, i.e., source pointer 32, by 8 sample locations or bytes, which translates to a time delay from the source 10 to the destination 22 (or 38) devices of about 1 ms, where 20 ms of data are stored in each portion 28A and 28B (160 bytes) of common buffer 28. A time delay of 1 ms is a speed fast enough to appear simultaneous to human sensory perceptions, facilitating the illusion of interactivity and isochronicity. It should be understood that further improvements in this area and further reductions in time delay are possible through hardware upgrades and modifications as well as changes to the transference protocol for computers such as PCs, e.g., the aforementioned USB protocol.

The previous description is of preferred embodiments for implementing the invention, and the scope of the invention should not necessarily be limited by this description. The scope of the present invention is instead defined by the following claims.

What is claimed is:

1. A system for the isochronous transfer of a multiplicity of data from a source device to a destination device, said system comprising:

a common data buffer shared by said source and said destination devices, said common buffer being divided into at least two separate portions, each said portion being divided into a multiplicity of discrete sample locations therein, said system including a source transference means to transfer said multiplicity of data from said source device to said common buffer, and a destination transference means to transfer said transferred data within said common buffer to said destination device;

a source indicia for indicating the sample location within said common buffer of the data transference of said source transference means, said data being transferred into said common buffer in accordance with the sample location indicated by said source indicia, said source indicia, after filling a given sample location with said data, being incremented to the next sample location within said common buffer; and a destination indicia for indicating the sample location within said common buffer of the data transference of said destination transference means, said data being transferred from said common buffer to said destination device in accordance with the sample location indicated by said destination indicia, said destination indicia, after transference of the data within said given sample location, being incremented to the next sample location within said common buffer such that the sample location indicated by said destination indicia is a predetermined plurality of sample locations behind the sample location indicated by said source indicia, said source indicia, upon filling one of said portions of said common buffer with data, carrying over to another of said portions, and said destination indicia, upon transferring all data within said one portion, carrying over to said another portion.

2. The system according to claim 1, wherein said common buffer is within a computer memory, said source and destination devices being in communication with said computer memory via said respective source and destination transference means.

3. The system according to claim 1, wherein said at least two separate portions of said common buffer are equal in size.

4. The system according to claim 1, wherein the sizes of said at least two separate portions are variable.

5. The system according to claim 1, further comprising data initialization means for initializing said one portion of said common buffer after all of said data within said one portion has been transferred by said destination transference means to said destination device.

6. The system according to claim 1, wherein the size of said portions of said common buffer match a given time interval of data transmission.

7. The system according to claim 1, wherein said data is sound data.

8. The system according to claim 1, wherein said data is video data.

9. The system according to claim 1, further comprising a second destination device, a second destination transference means and a second destination indicia, said second destination indicia indicating an initial sample location within a next portion of said common buffer, the transference of said multiplicity of data to said destination device being diverted, in response to a signal sent by said destination device, from said common buffer to said second destination device in accordance with the sample location indicated by said second destination indicia.

10. The system according to claim 1, wherein one of said source and destination devices is selected from the group consisting of telephones, microphones, modems, keyboards, mice, joysticks, scanners, printers, CD-ROM devices, tape drives and floppy drives.

11. The system according to claim 1, wherein said predetermined plurality of sample locations that said destination transference means trails said source transference means is equivalent to a time delay of from about 1 ms to 5 ms.

12. The system according to claim 2, wherein the computer within said system operates under a Universal Serial Bus protocol.

13. The system according to claim 2, wherein said source indicia comprises a source pointer within said computer memory associated with the data transference by said source transference means, said data being transferred into said common buffer in accordance with the sample location indicated by said source pointer.

14. The system according to claim 2, wherein said destination indicia comprises a destination pointer within said computer memory associated with the data transference by said destination transference means, said data being transferred from said common buffer in accordance with the sample location indicated by said destination pointer.

15. The system according to claim 3, wherein said at least two separate portions comprise two separate portions.

16. The system according to claim 5, wherein said data initialization means formats said sample locations within said one portion in accordance with the type of data being transferred.

17. The system according to claim 6, wherein said time interval equals about 20 ms.

18. The system according to claim 7, wherein said data is voice data.

19. The system according to claim 11, wherein said time delay is about 1 ms.

20. The system according to claim 13, further comprising a queuing source pointer within said computer memory associated with the data transference by said source transference means, said queuing source pointer pointing to said another portion of said common buffer.

21. The system according to claim 14, further comprising a queuing destination pointer within said computer memory associated with the data transference by said destination transference means, said queuing destination pointer pointing to said another portion of said common buffer.

22. The system according to claim 20, wherein, after filing said one portion of said common buffer with data, the sample location indicated by said source pointer is changed to the sample location indicated by said queuing source pointer, and the position of said queuing source pointer is changed to a next portion of said common buffer.

23. The system according to claim 21, wherein, after transferring all of the data within said one portion of said common buffer to said destination device, the sample location indicated by said destination pointer is changed to the sample location of said queuing destination pointer, and the sample location of said queuing destination pointer is changed to a next portion of said common buffer.

24. A method for the isochronous transfer of a multiplicity of data from a source device to a destination device, said method comprising the steps of:

allocating a common buffer shared by said source and destination devices, said common buffer being divided into at least two separate portions, each said portion being divided into a multiplicity of discrete sample locations therein;

setting a source indicia for said source device and a destination indicia for said destination device to an initial sample location within said common buffer;

transferring said multiplicity of data from said source device to said common buffer by a source transference means, said data being transferred into said common buffer in accordance with the sample location indicated by said source indicia, said source indicia, after filling a given sample location with said data, being incremented to the next sample location within said common buffer; and transferring said multiplicity of data from said common buffer to said destination device by a destination transference means, said data being transferred into said destination device in accordance with the sample location indicated by said destination indicia, said destination indicia, after transference of the data within said given sample location, being incremented to the next sample location within said common buffer such that the sample location indicated by said destination indicia within said common buffer is a predetermined plurality of sample locations behind the sample location indicated by said source indicia, said transferring of data from said source device to said common buffer, upon filling one of said portions of said common buffer with data, carrying over to another of said portions, and said transferring of data from said common buffer to said destination device, upon transferring all data within said one portion, carrying over to said another portion.

25. The method according to claim 24, further comprising the step of:

setting a new destination indicia for a new destination device to an initial sample location position within said common buffer, and diverting from said destination device, in response to a signal sent by said destination device, said multiplicity of data from said common buffer to said new destination device by a second destination transference means, said data being transferred to said new destination device in accordance with the sample location indicated by said new destination indicia, the sample location indicated by said new destination indicia being another predetermined plurality of sample locations behind the sample location indicated by said source indicia.

* * * * *